(12) United States Patent
Tran

(10) Patent No.: US 9,387,800 B2
(45) Date of Patent: Jul. 12, 2016

(54) LIGHTING APPARATUS COMPRISING A CONTROL DEVICE AND AIRCRAFT COMPRISING THE LIGHTING APPARATUS

(71) Applicant: Diehl Aerospace GmbH, Ueberlingen (DE)

(72) Inventor: Trong Tran, Erlangen (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 14/730,383

(22) Filed: Jun. 4, 2015

(65) Prior Publication Data

US 2015/0353004 A1 Dec. 10, 2015

(30) Foreign Application Priority Data

Jun. 7, 2014 (DE) .......................... 10 2014 008 615

(51) Int. Cl.
*H05B 37/02* (2006.01)
*B60Q 3/02* (2006.01)
*H05B 33/08* (2006.01)

(52) U.S. Cl.
CPC ................ *B60Q 3/02* (2013.01); *H05B 33/083* (2013.01); *H05B 33/0812* (2013.01); *H05B 33/0815* (2013.01); *H05B 37/02* (2013.01); *Y02B 20/343* (2013.01)

(58) Field of Classification Search
CPC ................................. H05B 37/00; H05B 37/02
USPC .......... 315/122, 185 R, 186, 192, 193, 209 R, 315/224–225, 291
See application file for complete search history.

(56) References Cited

U.S. PATENT DOCUMENTS

| | | | |
|---|---|---|---|
| 2007/0170876 A1 | 7/2007 | Ito et al. | |
| 2009/0015172 A1 | 1/2009 | Huang et al. | |
| 2011/0227489 A1* | 9/2011 | Huynh | H05B 33/083 315/185 R |
| 2012/0056543 A1 | 3/2012 | Yang et al. | |
| 2012/0081009 A1* | 4/2012 | Shteynberg | H05B 33/083 315/122 |
| 2013/0099683 A1* | 4/2013 | Sakuragi | H05B 33/083 315/185 R |
| 2013/0106291 A1 | 5/2013 | Tran | |
| 2013/0320868 A1* | 12/2013 | Kim | H05B 33/083 315/186 |
| 2014/0265890 A1* | 9/2014 | Ito | B60Q 1/00 315/186 |
| 2014/0361691 A1* | 12/2014 | Nederbragt | H05B 33/083 315/122 |

FOREIGN PATENT DOCUMENTS

| | | |
|---|---|---|
| DE | 102007003575 B4 | 1/2009 |
| DE | 102012000605 A1 | 5/2013 |

* cited by examiner

*Primary Examiner* — Tung X Le
(74) *Attorney, Agent, or Firm* — Scully Scott Murphy and Presser

(57) ABSTRACT

A lighting apparatus for an AC voltage supply is provided. A rectifier module of the apparatus converts an AC voltage from the AC voltage supply into a rectified supply voltage. A diode cascade of the apparatus has multiple diode cascade sections connected in series and each having an LED. Each diode cascade section has a connectable bypass device for bypassing the diode cascade section. The diode cascade section is in an illuminated state when the bypass device is deactivated and a dark state when the bypass device is activated. A current source module is provided for stabilizing the cascade current through the diode cascade to a setpoint value. At least one diode cascade section has a control device, which has a switching device for converting the detected illuminated state into a switching signal for reducing the setpoint value.

10 Claims, 2 Drawing Sheets

LIGHTING APPARATUS COMPRISING A CONTROL DEVICE AND AIRCRAFT COMPRISING THE LIGHTING APPARATUS

BACKGROUND OF THE INVENTION

The invention relates to a lighting apparatus for an AC voltage supply comprising a rectifier module, wherein the rectifier module converts an AC voltage from the AC voltage supply into a rectified supply voltage, comprising a diode cascade, wherein the diode cascade has a plurality of diode cascade sections, wherein at least one LED is arranged in each of the diode cascade sections, and wherein the diode cascade sections are connected in series in the diode cascade, wherein the diode cascade sections each have a connectable bypass device for bypassing the associated diode cascade section, wherein the bypass device is connected on the basis of the voltage level of the rectified supply voltage, wherein the diode cascade section is in an illuminated state when the bypass device is deactivated and is in a dark state when the bypass device is activated, comprising a current source module for stabilizing the cascade current through the diode cascade to a setpoint value. In addition, the invention relates to an aircraft comprising the lighting apparatus.

DISCUSSION OF THE PRIOR ART

For reasons of energy efficiency and lightweight design, LEDs are increasingly being used as light-emitting means instead of the previously conventional incandescent bulbs in aircraft. However, the voltage supplies in aircraft are generally AC voltage supplies, and therefore the mains voltages first need to be conditioned for use with LEDs. Since LEDs have a narrow operating window for the operating voltage, supply circuits for the LEDs need to be designed such that the LEDs are always operated at the working point despite the AC voltage as mains voltages and the therefore varying voltage levels. This is achieved, for example, by virtue of the fact that the AC voltage is rectified and the resultant pulsed DC voltage is used for supplying the LEDs. In this case, a switching strategy is used whereby LEDs in an LED series are connected or disconnected, to be precise depending on the presently available voltage level. This procedure means that so many LEDs in a series are always activated for the present voltage to be utilized advantageously or even optimally.

Document DE 10 2012 000 605 A1, which forms the closest prior art, discloses such a lighting apparatus.

SUMMARY OF THE INVENTION

An object of the present invention consists in proposing a lighting apparatus for an AC voltage supply which is characterized by a homogeneous light emission.

In accordance with the invention, therefore, an LED lighting apparatus is disclosed which is suitable and/or designed for an AC voltage supply. The AC voltage supply is in particular an alternating and/or sinusoidal AC voltage supply. Specifically, the LED lighting apparatus is designed for an AC voltage supply of an aircraft. Such an AC voltage supply has an rms voltage of between 100 and 200 volts, in particular an rms voltage of 115 volts, and a frequency of between 200 and 600 hertz, in particular 400 hertz. The AC supply voltage supplies in aircraft are designed to vary significantly in terms of the characteristic values, the rms voltage and the frequency. However, a basic concern is to ensure a uniform illumination in the aircraft despite the fluctuating AC voltage supply.

The LED lighting apparatus has a rectifier module, wherein the rectifier module converts an AC voltage of the AC voltage supply into a rectified supply voltage. For example, the rectifier module can comprise a half-wave rectifier or a bridge rectifier for rectification. In particular, the AC voltage is converted into a pulsed DC voltage. In a possible configuration of the invention, the lighting apparatus comprises a bridge rectifier for rectifying the voltage of the AC voltage source, wherein the supply voltage formed in the process for the LED lighting apparatus is in the form of a reversed AC voltage.

The LED lighting apparatus comprises at least one diode cascade, wherein the diode cascade has a plurality of diode cascade sections. At least one LED is arranged in each of the diode cascade sections. Particularly preferably, in each case a plurality of LEDs, in particular connected in series with one another, are arranged in the diode cascade sections. It is possible in principle for even a plurality of LEDs to be connected in parallel with one another within the diode cascade sections. The diode cascade sections are connected in series with one another in the diode cascade. Some or all of the diode cascade sections each have a bypass device, wherein an input to the bypass device upstream of the diode cascade section and an output of the bypass device downstream of the diode cascade section is brought into electrical contact with the diode cascade. In particular, the LEDs in the diode cascade section are bypassed by the bypass device.

The bypass device or the bypass devices is/are connected on the basis of the voltage level of the rectified supply voltage. If the bypass device is deactivated and therefore the bypass is blocked, the associated diode cascade section is in an illuminated state. For the case where the bypass device is activated and forms a bypass to the diode cascade section, said diode cascade section is in a dark state. In particular, the actuation or switching of the bypass devices is implemented in such a way that a corresponding number of diode cascade sections in the diode cascade is always in the illuminated state corresponding to the present voltage level of the supply voltage so that the voltage level can be utilized advantageously or even optimally.

The control of the bypass devices can take place, for example, via a digital processing device, which uses the present voltage level of the supply voltage as an input variable and activates or deactivates the bypass devices depending on the input variable. However, it is particularly preferred that the bypass devices are actuated and/or switched in analogue fashion. In particular, it is preferred that the bypass devices each have a bypass control circuit, which uses the voltage present locally at the diode cascade section as input variable for controlling and/or switching the bypass device and therefore switches the bypass devices on the basis of the rectified supply voltage.

In addition, the LED lighting apparatus has a current source module for stabilizing, in particular setting, the cascade current which flows through the diode cascade to a setpoint value. In particular, the current source module is in the form of a regulated current source module, wherein the cascade current or a variable equivalent thereto is measured as an actual variable, compared with a setpoint value and stabilizes, in particular regulates, the cascade current depending on the difference between the actual variable and the setpoint value.

Within the scope of the invention, it is proposed that at least one of the diode cascade sections, some or even all of the diode cascade sections, each have a control device. The control device is designed functionally to detect the illuminated state of the diode cascade section to distinguish it from the dark state of the diode cascade section and to reduce the setpoint value for the cascade current in response to the detected illuminated state of the associated diode cascade section.

Thus, in the case of an increase in the voltage level of the rectified supply voltage, firstly one or more diode cascade sections are transferred from the dark state to the illuminated state. Given a constant cascade current, this change would result in an increase in the luminosity of the diode cascade. In order to avoid or at least restrict a resultant fluctuation in the luminosity, it is proposed that the setpoint value of the cascade current is reduced as soon as an additional diode cascade section is transferred from the dark state to the illuminated state. If the available power for the LEDs is fundamentally considered as P=U*I, an increase in the rectified supply voltage results in an increase in the power P. Therefore, the lighting apparatus has increased luminosity. In order to keep the luminosity of the lighting apparatus constant, however, the current I, i.e. the cascade current, needs to be reduced. This is performed by the control device, which reduces the setpoint value of the cascade current. Thus, the invention provides a possibility for keeping the luminosity of the LED lighting apparatus more homogeneous over time.

In a preferred implementation of the invention, the control device is arranged in terms of circuitry in such a way that it taps off an operating voltage, in particular a partial operating voltage, of the associated diode cascade section for detection of the illuminated state of the associated diode cascade section. Thus, the detection is performed by virtue of checking for the presence of an operating voltage and therefore electrically/electronically and not via an optical sensor system. This implementation has the advantage that this detection method also functions very reliably over relatively long operating times and is not contamination-critical in comparison with optical detection methods.

In a preferred configuration of the invention, the operating voltage is in the form of the LED voltage across at least one LED of the associated diode cascade section. Thus, the control device taps off the operating voltage present across at least one or precisely one LED for detection of the illuminated state. If the diode cascade section is in the dark state, the operating voltage is equal to zero. If, on the other hand, the diode cascade section is in the illuminated state, there is an operating voltage drop across the LED and the control device can conclude that there is the illuminated state via the tapped off operating voltage.

It is particularly preferred that the control device has a switching device for converting the detected illuminated state into a switching signal for reducing the setpoint value. Thus, the information of the state of the diode cascade section is converted into a switching signal, which in particular has two discrete switching states (on/off), in order to facilitate further signal processing for changing the setpoint value.

Particularly preferably, the switching device is in the form of an optocoupler. The transmitter side of said optocoupler is connected to the operating voltage so that said transmitter side becomes active when there is a sufficiently high operating voltage. In particular, the transmitter side is in the form of a light-emitting diode. If the present operating voltage is greater than the forward voltage of the light-emitting diode on the transmitter side of the optocoupler, the light-emitting diode of the optocoupler illuminates. On the reception side of the optocoupler, alternatively an illumination of the light-emitting diode or non-illumination of the light-emitting diode of the optocoupler is received, in particular by a phototransistor, so that the switching signal is formed. The optocoupler is generally potted, so that no contamination problems can be expected despite the optical signal transmission. A further advantage of the optocoupler consists in that it results in galvanic decoupling between the control device and the diode cascade section.

Provision is preferably made for the setpoint value to be preset on the basis of a setpoint voltage value, in particular to the current source module, wherein the switching device reduces the setpoint voltage value by the switching signal.

In a possible circuitry configuration, the setpoint voltage value is formed by tapping off using a voltage divider, at which a constant reference voltage value is present. An additional resistor is connected in parallel with one of the voltage divider sections by the switching device, so that the setpoint voltage value and therefore the setpoint value are reduced. Should a plurality of the diode cascade sections have such a control device, each of the control devices can connect a dedicated additional resistor in parallel with the voltage divider section and/or in parallel with the other additional resistors so that the setpoint voltage value can also be reduced a plurality of times or in a plurality of stages.

In a preferred development of the invention, the current source module has a comparator and a switching element, wherein the comparator compares the setpoint voltage value with an equivalent value for the cascade current and actuates the switching element depending on the comparison result. The equivalent value can be formed as a voltage tapped off via a resistor, for example. If the equivalent value for the cascade current is less than the setpoint voltage value, the switching element is closed; if the equivalent value is greater than the setpoint voltage value, the switching element is opened. In particular, the switching element is arranged in such a way that it can interrupt the diode cascade completely. In particular, the switching element can be arranged upstream of the diode cascade, downstream of the diode cascade or in the diode cascade.

In a preferred implementation of the invention, the comparator is in the form of an operational amplifier and the switching element is in the form of a transistor, in particular a switching transistor, wherein the setpoint voltage value and the equivalent value are present at the inputs of the operational amplifier, and the output of the operation amplifier is coupled to the base of the transistor.

Overall, it is preferred that the control device and/or the bypass device can each be formed as analogue circuits. Such analogue circuits are particularly inexpensive to produce since the individual electronic component parts are very inexpensive. In addition, analogue circuits can be made to be more robust than digital circuits.

In a preferred implementation of the invention, the bypass devices each have a transistor. In a possible, circuitry embodiment of the invention, the bypass device comprises in each case one transistor, in particular a metal-oxide semiconductor field-effect transistor (MOSFET), wherein the bypass is provided via the source and the drain of the transistor, wherein an auxiliary voltage is present at the gate of the transistor, said auxiliary voltage defining a limit voltage. It is also possible to use a bipolar transistor or another switch instead of the MOSFET. The circuitry configuration ensures that the function of connection and disconnection of the bypass of the bypass device is implemented safely, reliably and at low cost. In particular, the bypass device is designed as described in document DE 10 2012 000 605 A1, the disclosure content of which is incorporated by reference in the present disclosure.

It is particularly preferred that the rectified supply voltage is in the form of a reversed AC voltage and/or a pulsating supply voltage. Specifically, the rectified supply voltage is formed as a series of half-waves, in particular sinusoidal half-waves, next to one another. During a half-wave, the diode cascade sections are connected or disconnected by means of the bypass devices owing to the changing voltage level of the supply voltage, so that the number of LEDs in the illuminated state changes considerably over the half-wave. With these boundary conditions, the matching of the setpoint value for the cascade current can have a particularly strong effect in the homogenization of the luminosity of the diode cascade over time.

A further subject of the invention relates to an aircraft comprising the lighting apparatus as described previously. The LED lighting apparatus is in particular formed in a passenger interior for illuminating passenger seats and/or the passenger interior as a whole. In particular, the LED lighting apparatus has a plurality of diode cascades.

BRIEF DESCRIPTION OF THE DRAWINGS

Further features, advantages and effects of the invention are set forth in the description below of a preferred exemplary embodiment of the invention and the attached figures, in which.

DETAILED DESCRIPTION OF THE INVENTION

Figure 1:
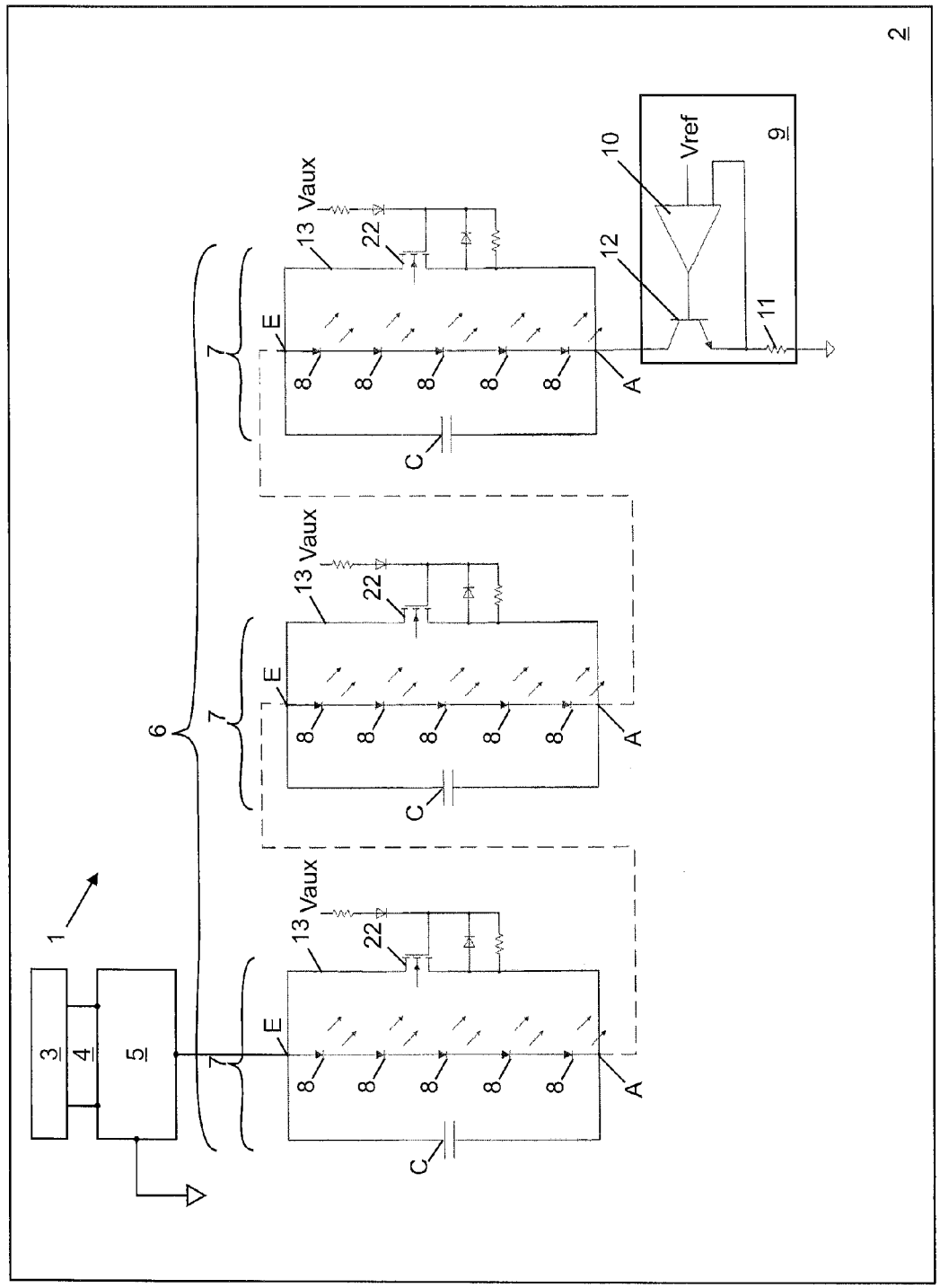
FIG. 1 shows a schematic block diagram of a lighting apparatus in an aircraft as a first exemplary embodiment of the invention.

FIG. 1 shows a very schematized illustration of a lighting apparatus 1 in an aircraft 2 as an exemplary embodiment of the invention. The lighting apparatus 1 is designed for connection to an AC voltage supply of a supply grid 3 of the aircraft 2. The supply grid 3 provides an AC voltage with an rms voltage of 115 volts and a frequency of 400 hertz. Both the rms voltage and the frequency can fluctuate, and thus the rms voltage can fluctuate between 90 and 130 V and/or the frequency can fluctuate between 300 Hz and 500 Hz.

The lighting apparatus 1 has an AC voltage input 4, via which the supply grid 3 is connected. Starting from the AC voltage input 4, a rectifier module 5 is provided, which converts the AC voltage into a rectified supply voltage. The rectified supply voltage is in particular a pulsed DC voltage. In particular, the rectifier module 5 has a half-wave or full-wave rectifier, so that the rectified supply voltage is formed as a sequence of sinusoidal half-waves at twice the frequency of the supply grid 3.

The lighting apparatus 1 comprises a diode cascade 6, which has a plurality of, in this example 3, diode cascade sections 7. The diode cascade sections 7 are each connected in series with one another, wherein the dashed lines also indicate that further diode cascade sections 7 can be provided.

In each case LEDs 8 are arranged in the diode cascade sections 7, said LEDs being connected in series between a section input E and a section output A. It is possible to also use a plurality of parallel-connected LEDs instead of one individual one of the LEDs 8. The LEDs 8 in the various diode cascade sections 7 are arranged in the aircraft 2, in particular in an interior of the aircraft, in such a way that they can illuminate a passenger seat or the aircraft interior as a whole. The LEDs can be in the form of white LEDs, coloured LEDs or OLEDs.

In this example, a current source module 9 is arranged at the end of the diode cascade 6, said current source module performing the function of stabilizing a cascade current IK through the diode cascade 6 and setting said cascade current to a setpoint value, which is preset by a setpoint voltage value Vref. The current source module 9 has a comparator 10 in the form of an operational amplifier, wherein one input of the comparator 10 is occupied by the setpoint voltage value Vref and the other input is occupied by feedback from the diode cascade 6 upstream of an end resistor 11, wherein the feedback voltage value forms an equivalent value for the cascade current IK. The output of the comparator 10, in particular the output of the operational amplifier, is coupled in terms of the signalling to a switching element 12, wherein the switching element 12 is in the form of a transistor, and the output of the comparator 10 is present at the base of the transistor, wherein the switching element 12 turns on for the case where the equivalent value is greater than the setpoint voltage value Vref and otherwise interrupts the diode cascade 6. Thus, the current source module 9 forms a stabilization of the cascade current IK to the setpoint value preset by the setpoint voltage value Vref.

A bypass device 13, which completely bypasses all of the LEDs 8 of the respective diode cascade sections 7, is arranged in each of the diode cascade sections 7. In particular, the bypass device 13 bypasses the diode cascade section 7 between the section input E and the section output A. In addition, a capacitor C is arranged in parallel with the LEDs 8 and/or with the bypass device 13. The bypass device 13 is designed to bypass the LEDs 8 in the case of a low voltage present or in the case of no voltage present and to deactivate the bypass device 13 in the case of a limit value fixed by the circuit being exceeded and to transfer the diode cascade section 7 from a dark state to an illuminated state. The states are named thus since, as long as the bypass device 13 is activated so as to bypass, the cascade current IK flows through the bypass device 13 so that the LEDs 8 do not receive any current and remain dark. As soon as the bypass device 13 is deactivated and therefore the bypassing is deactivated, the cascade current IK flows through the LEDs 8 so that said LEDs illuminate. The bypass device 13 comprises in each case one transistor 22, in particular a MOSFET (metal-oxide semiconductor field-effect transistor), wherein the drain thereof is connected to the section input E and the source thereof is connected to the section output A. An auxiliary voltage Vaux is present at the control electrode of the transistor 22 via a resistor. The control electrode of the transistor 11 is coupled to the source of the transistor 22 via a second resistor. In each case one diode is arranged between the first resistor and the control electrode and in parallel with the second resistor.

The fact that the diode cascade sections 7 are connected in series means that, as the supply voltage increases, the bypass devices 13 of the successive diode cascade sections are deactivated one after the other and depending on the supply voltage, so that the diode cascade sections 7 are transferred from the dark state to the illuminated state one after the other. In the event of a reduction in the supply voltage once a maximum of the half-wave of the supply voltage has been exceeded, the diode cascade sections 7 are deactivated again in reverse order.

Figure 2:
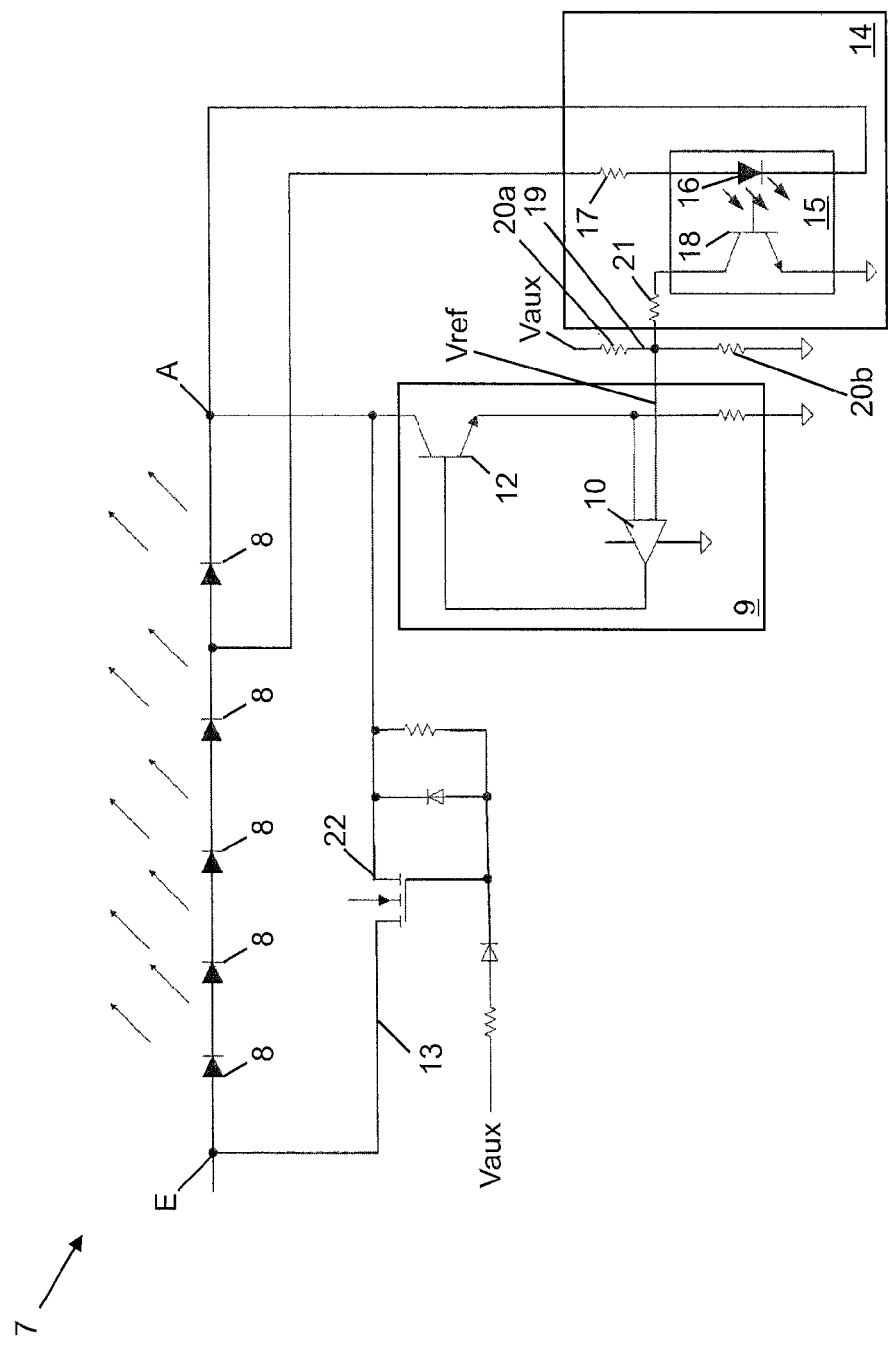
FIG. 2 likewise shows a schematic illustration of a diode cascade section of the lighting apparatus in FIG. 1 comprising a control device and the current source module.

By virtue of the successive deactivation of the bypass devices 13 and therefore the successive connection of the LEDs 8 in the diode cascade 6 as a function of the supply voltage, the voltage drop across the current source module 9 is at a minimum and the LED lighting apparatus is in a low-losses operating state. Since, however, given the same current intensity, the luminosity of the diode cascade 6 changes proportionally to the number of LEDs 8 in the illuminated state, homogenization of the luminosity of the diode cascade 6 can be achieved by matching of the setpoint value of the cascade current IK, as is explained in connection with FIG. 2:

FIG. 2 shows one of the diode cascade sections 7 in FIG. 1, wherein said diode cascade section is supplemented by a control device 14. The control device 14 is designed in terms of circuitry to match the setpoint value for the current source module 9. As input variables, the operating voltage is tapped off across an LED 8 of the associated diode cascade section 7 by the control device 14. This operating voltage is supplied to an optocoupler 15, which is in the form of a switching device. A light-emitting diode 16 is arranged in the optocoupler 15, said light-emitting diode being activated by the operating voltage being tapped off and possibly via the matching of an upstream resistor 17 when the LED 8 in the diode cascade section 7 is also activated. In addition, the optocoupler 15 has a phototransistor 18, which is closed during illumination of the light-emitting diode 16 in the optocoupler 15.

FIG. 2 shows the design of the current source module 9 once again, showing that the setpoint voltage value Vref is generated by a voltage divider 19. The voltage divider 19 has a first and a second resistor 20a, b and is supplied an auxiliary voltage Vaux. The tapping off of the setpoint voltage value Vref is performed between the resistors 20a, b. An additional resistor 21 is connected in parallel with the second resistor 20b by virtue of the phototransistor 18 so that the total resistance of the resistors 20b and 21 is reduced in comparison with the individual resistance of the resistor 20b. As a result, the setpoint voltage value Vref is also reduced, which is supplied to the current source module 9 and in particular the comparator 10.

By virtue of the reduction in the setpoint voltage value Vref in response to a diode cascade section 7 being transferred from a dark state to an illuminated state, the setpoint value for the cascade current IK is thus reduced so that the total luminosity of the diode cascade 6 is kept either constant or at least uniform despite an increase in the number of illuminated LEDs 8.

Provision can be made for each of the diode cascade sections 7 to have such a control device 14. The additional resistors 21 can each be matched in such a way that a homogeneous luminosity of the diode cascade 6 is provided. However, it is also possible for certain inhomogeneities to be accepted over time, with the result that, for example, only the setpoint value is corrected when the last 30% of the LEDs 8 or the diode cascade sections 7 are connected in order to achieve more homogeneous illumination on average.

LIST OF REFERENCE SYMBOLS

1 Lighting apparatus
2 Aircraft
3 Supply grid
4 AC voltage input
5 Rectifier module
6 Diode cascade
7 Diode cascade section
8 LED
9 Current source module
10 Comparator
11 End resistor
12 Switching element
13 Bypass device
14 Control device
15 Optocoupler
16 Light-emitting diode
17 Resistor
18 Phototransistor
19 Voltage divider
20 Resistor
21 Additional resistor
22 Transistor
E Section input
A Section output
C Capacitor
IK Cascade current
Vref Setpoint voltage value
Vaux Auxiliary voltage

What is claimed is:

1. A lighting apparatus for an AC voltage supply, the apparatus comprising:
    a rectifier module, wherein the rectifier module converts an AC voltage from the AC voltage supply into a rectified supply voltage,
    a diode cascade, wherein the diode cascade comprises a plurality of diode cascade sections, wherein at least one LED is arranged in each of the diode cascade sections, and wherein the diode cascade sections are connected in series in the diode cascade,
    wherein the diode cascade sections each comprises a connectable bypass device for bypassing an associated diode cascade section, wherein the bypass device is connected on the basis of the voltage level of the rectified supply voltage, wherein the diode cascade section is in an illuminated state when the bypass device is deactivated and is in a dark state when the bypass device is activated, and
    a current source module for stabilizing the cascade current through the diode cascade to a setpoint value,
    wherein at least one of the diode cascade sections comprises a control device for detecting the illuminated state of the diode cascade section and for reducing the setpoint value of the cascade current when the illuminated state of the diode cascade section is detected,
    wherein the control device comprises a switching device for converting the detected illuminated state into a switching signal for reducing the setpoint value.

2. The lighting apparatus according to claim 1, wherein the control device taps off an operating voltage of the associated diode cascade section for detecting the illuminated state of the associated diode cascade section.

3. The lighting apparatus as claimed in claim 2, wherein the operating voltage is in the form of an LED voltage across at least one LED of the associated diode cascade section.

4. The lighting apparatus according to claim 1, wherein the switching device is in the form of an optocoupler for detecting an operating voltage and for converting said operating voltage into the switching signal.

5. The lighting apparatus according to claim 1, wherein the setpoint value is preset on the basis of a setpoint voltage value, wherein the switching device reduces the setpoint voltage value by means of the switching signal.

6. The lighting apparatus according to claim 5, wherein the setpoint voltage value is generated by tapping off through the usage of a voltage divider, at which a reference voltage value is present, wherein an additional resistor is connected in parallel with a voltage divider section by the switching device to reduce the setpoint voltage value.

7. The lighting apparatus according to claim 1, wherein the current source module comprises a comparator and a switching element, wherein the comparator compares the setpoint voltage value with an equivalent value for the cascade current and actuates the switching element.

8. The lighting apparatus according to claim 1, wherein the control device and the bypass device are formed as analogue circuits.

9. The lighting apparatus according to claim 1, wherein the rectified supply voltage is in the form of a pulsating supply voltage.

10. An aircraft comprising the lighting apparatus according to claim 1, wherein the lighting apparatus is arranged for illuminating a passenger interior of the aircraft.

* * * * *